Sept. 21, 1937. S. ROSENZWEIG 2,093,930
VIBRATION DAMPER
Filed Oct. 16, 1935 2 Sheets-Sheet 1
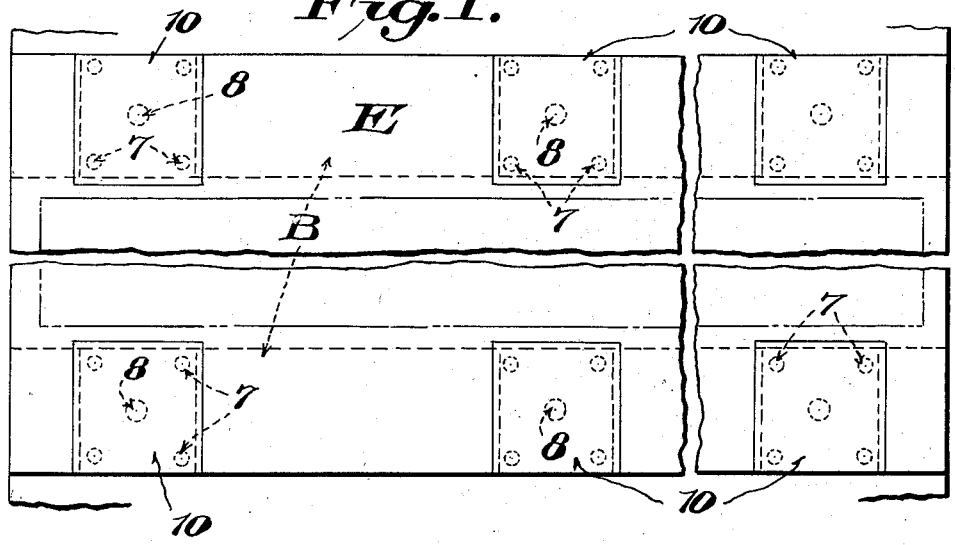
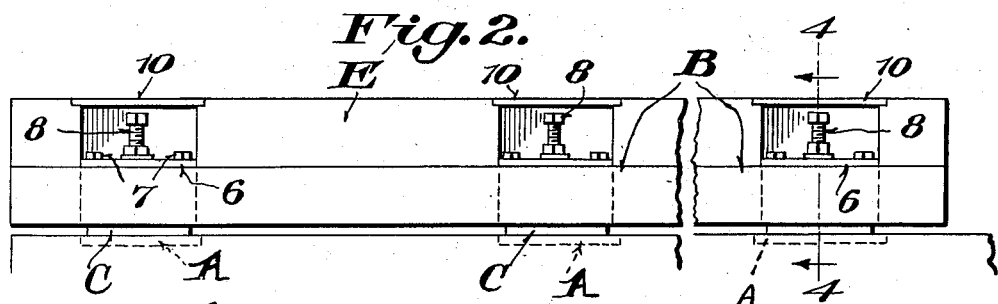
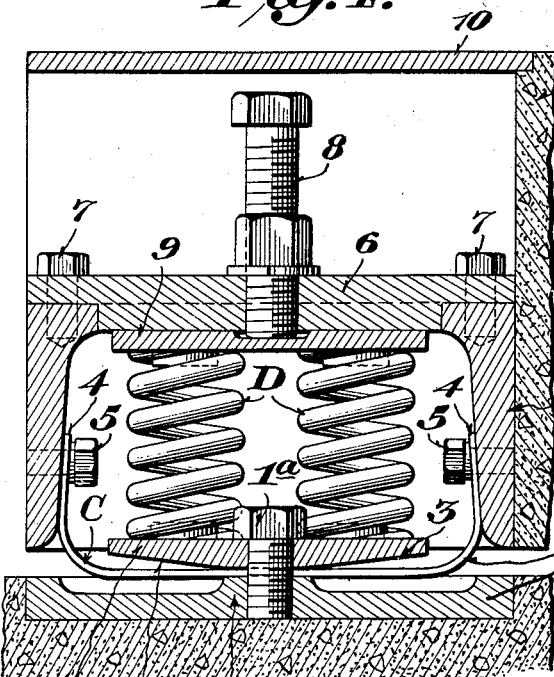
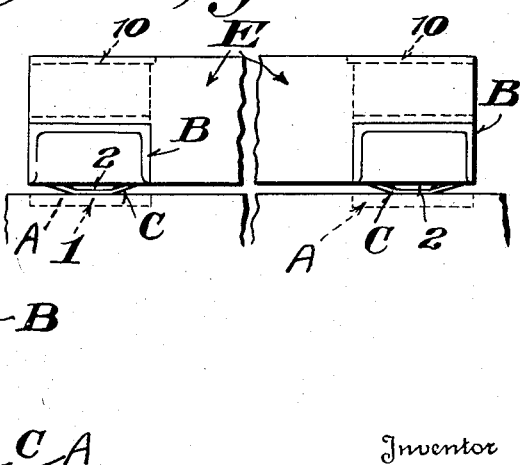
Inventor
S. Rosenzweig,
By D. P. Wolhaupter
Attorney Sept. 21, 1937.  S. ROSENZWEIG  2,093,930
VIBRATION DAMPER
Filed Oct. 16, 1935   2 Sheets-Sheet 2
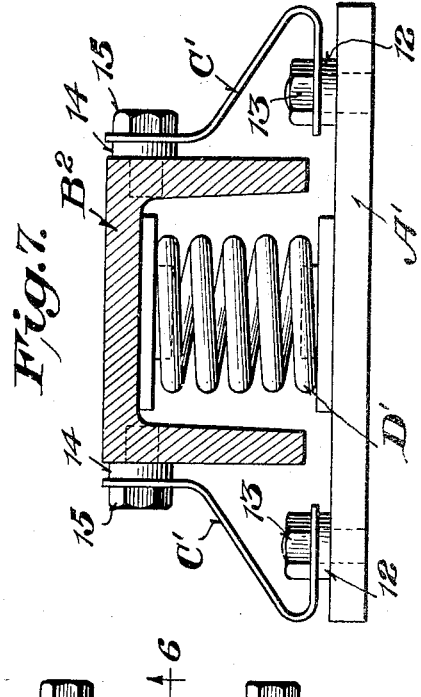
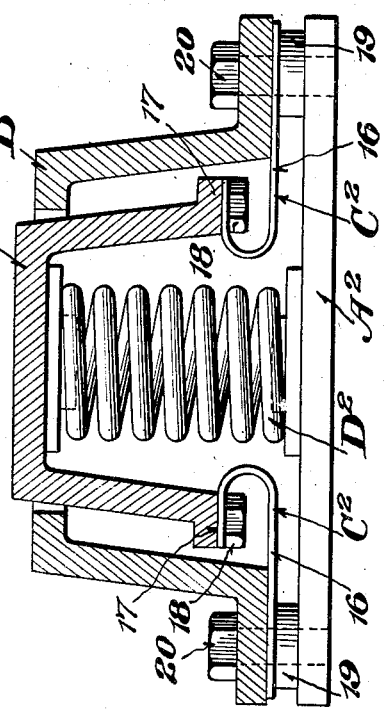
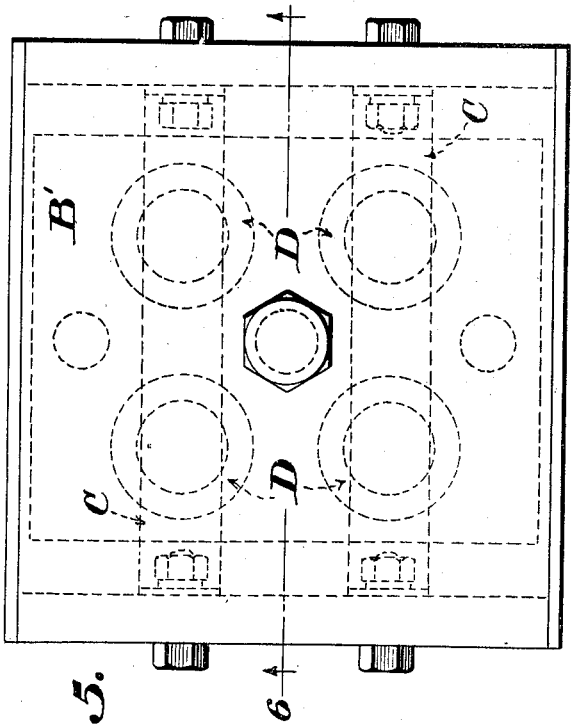
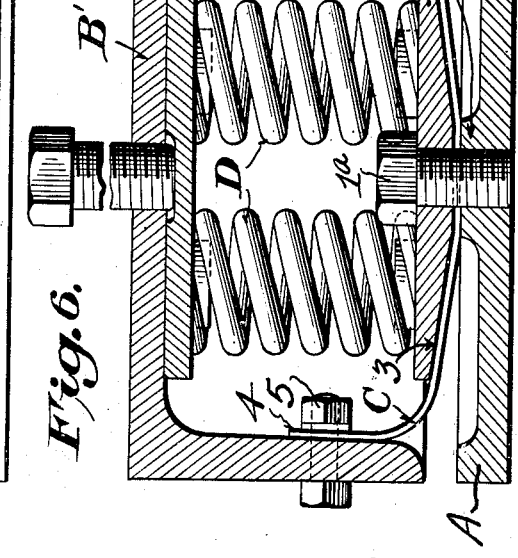
Inventor
S. Rosenzweig,
By D. P. Wolhaupter
Attorney Patented Sept. 21, 1937

2,093,930

UNITED STATES PATENT OFFICE 2,093,930

VIBRATION DAMPER

Siegfried Rosenzweig, Long Island City, N. Y.

Application October 16, 1935, Serial No. 45,354

22 Claims. (Cl. 248—20)

This invention relates to vibration damping devices of the type used to isolate machinery, more particularly heavy duty machinery, from the floor or foundation, adequately to support the load and absorb the shock incident to machinery foundation.

One of the objects of the invention is to provide a damper construction which lends itself particularly to embodiment in a poured concrete foundation or machinery base wherein it is usually difficult to align a number of dampers. That is to say, the present construction is adapted to the utilization of channel irons or other suitable steel shapes as a part of the spring damper and which may also act as a reinforcement for the foundation or platform and still be made so as to permit of ready access to the damping springs to effect adjustment or repair when necessary. Thus, it will be apparent that the novelty of the new construction consists of the steel construction suitable for concrete foundations and other machines requiring alignment where such steel members are made part of the spring damper. This is effected by either making the steel member part of the spring housing or by attaching the complete damper to it and providing openings in the steel member to remove springs etc. without disturbing alignment of foundation or machine. Removal can be made through the top of the foundation, or if preferable, sideways.

Moreover, it heretofore has been the general practice to mount machinery bases and the like on vibration damping devices consisting of or containing vertically disposed coil springs or even flat springs which are compressed under the weight of the superposed load. But, in either case there is no controlled limit to which the spring may move in either direction, vertically, except due to the limitation in the shape or characteristics of the spring itself, or by the undesirable contact or engagement of the rigid housing parts. While springs of these types, when compressed or loaded ordinarily adequately absorb the vibrations of the operating machine, and more or less effectively prevent the transmission of shocks to the floor or other surface on which the machine rests, nevertheless, when dealing with power plant machinery, different conditions and problems arise because it is impossible to avoid resonance when starting and stopping the machine, such for example as rotary or reciprocating engines. Therefore, it is highly desirable to provide some means of checking or controlling the upward surge of the damper and machine, thereby to prevent excessive oscillation, especially at resonance speeds.

Accordingly, a further object of the invention is to provide a vibration damper construction which is intended to effectually deal with this condition by providing a flat spring which may be used in combination with other springs, that normally sustain the main load not only to check excessive oscillation at resonance speed but also prevent excessive upward surge. In that connection, it is proposed to utilize a flat spring designed in such a manner that it has a very low frequency and will, therefore, deflect readily and not affect the main springs, but will immediately come into play to gradually check upward movement.

A further object is to provide a vibration damper construction which will absorb horizontal vibration parallel to the center line of a flat spring, which is not possible with the usual type of damper where coil springs or any other type of springs are arranged in a vertical direction.

With the above and other objects in view which will more readily appear as the nature of the invention is better understood, the same consists in the novel features of construction, combination and arrangement of parts, hereinafter more fully described, illustrated in the accompanying drawings and defined in the appended claims.

A preferred and practical embodiment of the invention is shown in the accompanying drawings, in which:—

Figure 1 is a top plan view of a machine base installation illustrating the adaptability of the invention to channel iron construction forming a part of the base.

Figure 2 is a side elevation of the construction shown in Figure 1.

Figure 3 is an end elevation of the construction shown in Figure 1, the springs being flexed under load.

Figure 4 is an enlarged detail sectional view taken on the line 4—4 of Figure 2, showing the springs loaded.

Figure 5 is a vertical cross-sectional view of a single unit embodying the present invention.

Figure 6 is a top plan view of the single unit shown in Figure 5.

Figure 7 is a detail cross-sectional view illustrating a modification of the invention.

Figure 8 is a detail cross-sectional view illustrating a further modification of the invention.

Similar reference characters designate corresponding parts throughout the several figures of the drawings.

In its general organization, the invention essentially includes a combination of parts comprising a damper base A, a damper housing B and the essentially horizontally disposed flat spring C constituting one of the distinctive features of the damper construction per se and which will hereinafter more fully be referred to in detail. According to the embodiment of the invention shown, the flat spring C may be also used in conjunction with the coil springs D. The damper housing B is embedded in and made a part of the foundation E which is molded concrete, and although the damper housing is shown as a channel member, it may be any other type of structural member suitable for the purpose.

By providing the combined damper housing and foundation reinforcing member with suitable openings at the location of the spring sets or units, the latter may be readily removed as will be more readily apparent as the detail description of the construction proceeds. The term "damper housing" is intended to mean the movable structural part of the damper located above the springs and embedded in the foundation on which the machine rests. It is preferably a continuous steel member of suitable length considering its position or location in the base. The damper base A may also be a continuous piece but preferably is a casting of a suitable size to provide an immediate or more or less localized support or ground for the springs as will be clear from Figures 1 and 2.

The foregoing type of construction has particularly advantageous merits in building heavy machine installations because of the manner in which it facilitates erection; insures accurate alignment of dampers to render them of maximum efficiency; and also provides a rigid and stable construction. In practice, the desired base castings are bolted to the floor and the channel irons or other structural members are placed above the castings. All of the steel members and dampers can be aligned and the necessary forms put in position and the concrete foundation poured to provide a homogeneous self-aligning foundation block. The combined channel iron and damper housing not only reinforces the concrete foundation but insures perfect alignment of the vibration damping units under all conditions of use. The foundation E is subjected principally to a shearing stress which it is well able to withstand especially when reinforced by construction running at right angles to the channel iron. Moreover, the entire assembly is such that easy access may be had to the individual dampers, and since the foundation as illustrated in Figures 1, 2 and 3 is comparatively low, it is possible to remove all of the parts from the vibration damper units after removing the top covers 10 which are provided mainly to give an unbroken or uninterrupted surface to the machinery foundation, or removing them sideways, if preferable, as shown in Figure 2.

In the construction shown in Figures 1 to 4 inclusive, it may be pointed out that the base A is provided with a central boss 1 on which the intermediate portion of the flat spring C, which is of substantially bowed or U-shaped formation, rests. The said intermediate portion of the spring C is securely clamped to the base control or stop plate 2 by a fastening 1ᵃ so that it is in effect a part of the base. Although the spring C is made in one piece, the opposite arms thereof serve in effect as separate springs which include the horizontal portions underlying the plate 2 and the vertical portions which are connected to the damper housing B as will presently appear. The under side of the plate 2 is tapered or flared in opposite directions as indicated at 3 to provide abutment surfaces for progressively engaging the opposite horizontal arms of the spring. This flare or inclination 3 is important in the respect that its predetermined formation serves to gradually shorten the spring to control and check the tendency of upward movement of the damper housing and machinery base. The upper ends 4 of the vertical arms of the spring are anchored or connected by fastenings 5 to the side walls of a channel member which constitutes the damper housing B. This channel member may be a continuous structural element extending along the sides of the machinery foundation or platform E as shown in Figures 1, 2 and 3 and the concrete of the base may overlie the web of the channel at all points except the location of the vibration damper units which are preferably purposely left accessible through interruptions in the concrete at these points. That is to say, to provide for access to the damping units, the concrete of the base is molded so as to leave the portions of the base immediately above the vibration dampers unoccupied or open to permit of access to a removable cap 6 provided on the channel iron at the location of the damper units. This cap 6 may be held to the channel iron proper by the fastenings 7 and is provided with an adjusting screw or bolt 8 which may operate an adjusting plate 9 for controlling the compression of the coil springs D whose lower ends bear on the upper side of the plate 2 which, with respect to the said springs serves more or less as a saddle on which the springs are supported.

To provide a flush upper surface for the machinery base E and also protect the adjusting screws 8, the recessed portions of the base E at the damper locations be provided with cover plates 10 seated in suitable rabbeted or shouldered portions formed in the concrete base itself.

Figures 5 and 6 of the drawings illustrate a construction similar in all essential respects to that shown in Figure 4, the only exception being that the damper housing B' is made as an individual unit rather than as a continuous channel. Therefore, the same description and same reference characters apply to these figures with the single difference above pointed out. In that connection, however, it may also be observed that the construction shown in Figures 5 and 6 illustrates the use of two pairs of coil springs D and a pair of flat springs C.

Referring to the function and operation of the springs C in Figures 1 to 6 inclusive, it may be pointed out that when the damper is in operating condition, the said springs are compressed and the flat spring will assume a position substantially half way between the control surfaces 3 and the upper side of the base plate. When the machine in starting and stopping passes through resonance speed or at any other time when there is an excessive upward surge, the damper housing will rise and lift the flat spring so that it will gradually come in contact with the control surfaces 3 of the plate 2, thereby progressively effecting a shortening of the spring to check the tendency to unload the coil springs and prevent upward movement. In other words, by gradually shortening the effective length of the spring arms, upward surge is gradually reduced and finally brought to a standstill when the arms of the spring have reached a position where they fully contact with the control surfaces 3 throughout their length. In the final position, this spring is subjected in a vertical direction to a low bending stress as it acts on a very short lever and principally to a tensional stress in a vertical direction and, therefore, it is capable of sustaining considerable force in a vertical direction. Thus, for these reasons, the flat spring C can be made comparatively light and have a low natural frequency which is of great importance in machinery isolation.

In connection with the control surfaces 3 of the plate 2, it may be pointed out that the shape or design shown may be varied according to the requirement of different installations, but in all cases the flat spring C from the point where it is clamped to the base and extending toward the damper housing will have a progressive engagement with the surface or surfaces 3 in such a way as to have the effect of shortening the spring arm as the same moves in response to load movement. When the damper housing is so placed in relation to the engine that the flat springs are at right angles to the engine shaft, the damper will effectively provided for the absorption of horizontal vibration. Likewise, the flat springs on the other hand provide great resistance to longitudinal thrust as required, for example, in connection with marine engines, as the flat springs and holding bolts are subjected to shearing stresses only.

There is another advantage to the arrangement shown in Figures 1–6. If the spring housing is subjected to a considerable horizontal force turning the housing to one side swinging around the center bolt as a pivot, one arm or one half of the spring will be depressed absorbing this vibration while the other half of the spring will be brought in contact with the stop surface 3 and thus to a certain degree limit the amount by which the housing is displaced from the horizontal level.

According to Figure 7 of the drawings, the base plate is designated as A'; the damper housing or load sustaining support is designated as B²; and the coil spring is shown at D'. The damper housing is preferably of substantially inverted U-shaped formation and may be of the continuous channel type shown in Figure 1 or the individual unit type shown in Figures 5 and 6. In any event, the element B² is supported by the coil spring (or springs) D' and flat spring elements C' serve to prevent upward surge. In this embodiment two separate springs are used for convenience in assembly, the same being of matched frequency and serving the same purpose as the double arm single spring heretofore described. They both have horizontal flexing portions and vertical tensioning arms. The lower horizontal arms of the said flat springs are mounted on washers 12 and are clamped by the headed fastenings 13 rigidly to the base. The upper ends of the vertically extending arms of said springs C' are similarly secured to the opposite sides of the element B² by washers and headed fastenings 14 and 15. With the type of spring shown in Figure 7 the upward surge is counteracted by the horizontal portion of the spring and the relatively bowed oblique portion between the anchored ends. These springs are so designed as to have proper flexure within the normal range of movement of the coil springs, but as the tendency to unload the coil springs increases, the resistance of the springs C' proportionally increases until, if necessary, they go into tension and may ultimately serve as a complete stop or check.

Figure 8 illustrates a further modification of the invention wherein the base plate is designated generally as A² and the damper housing comprises two parts, namely, the stationary element B³ and the movable element B⁴ which directly supports the load. Flat springs C² have a shank 16 and a hook portion 17 of substantially U-shaped formation and the shank portion is disposed in a horizontal direction. The upper free ends of the portions 17 are connected by fastenings 18 to the lower end of the movable load sustaining element B⁴. In this type of spring the shank portions constitute the horizontal parts which are responsive to check upward surge and the spring levers formed by said shank are augmented by the vertically disposed hook portions. The outer ends of the shank 16 of the springs C² are connected to the base plate A² through the medium of the washers 19 and fasteners 20. In the arrangement shown, it will be apparent that the springs C² will not only tend to resist upward surge but will also effectively resist side and longitudinal thrust.

The improved design illustrated in the several figures of the drawings provides an efficient check against movement above normal, or what may be termed rebound or tendency to unload the main springs, to the point of not only progressively checking upward surge but also providing a complete stop. While it has heretofore been proposed to prevent excessive upward surge by preventing the action of a spring or springs by a rigid stop or abutment, which in some instances may include a cushion of rubber, felt or cork, nevertheless, it is undesirable to rely on this kind of stop, because, in the case of heavy machines, the shock may be too great and break or shear the engaging surfaces, or, on the other hand, subject the machine itself to undesirable shock. The present arrangement provides a gradual resistance to upward swing so that if the disturbing upward movement does tax the flat springs to their limit of movement, the force of the unloading tendency is materially checked before the limit of movement is reached.

In all rotating machines, including vertical reciprocating machines where the reciprocating movement is turned into a rotating motion, there is not only an up and down thrust but also a decided horizontal torque and in such cases the coil and flat springs both are used. However, in the case of horizontal reciprocating engines, where the forces act principally in a horizontal direction, it is entirely possible to omit the coil springs and use the flat springs only. In the latter case, the flat springs would be made sufficiently stiff to support the static load acting in a vertical direction, as well as to progressively check upward surge, side thrust and shear.

In Figures 1–6 inclusive, the base and plate are to be considered as the base of the damper, the same being separate as a matter of convenience in assembly. Therefore, in all forms of the invention the base and damper housing are connected by a flat spring for the purposes herein set forth.

From the foregoing it will be apparent that the flat spring provides a progressive and definite yet elastic stop to upward move of vibration damper housing. This stop is provided to prevent sudden excessive upward surge, and to prevent excessive oscillation in the case of variable speed engines as for instance prime movers when passing through resonance speed. Other advantages of the flat spring are, to provide elastic suspension and therefore horizontal vibration absorption in a direction parallel to center line of spring, or in the case of prime mover at right angles to the engine shaft; to provide great resistance to longitudinal thrust; in the case of prime movers parallel to engine shaft as flat springs and holding bolts are subjected to shearing stresses only; to provide sufficient strength to sustain entire static and dynamic load or to do so in conjunction with other springs preferably of the coil type.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. Vibration isolation construction comprising in combination, a plurality of damper supports anchored to the floor, damping springs on said supports, continuous structural elements supported by the springs and forming spring housings therefor and also aligning the springs and their supports in proper position, said elements having spring access openings, cap members therefor, and a machinery base formed on and about the structural elements and permanently uniting the same in rigid relationship to the base.

2. The combination with a machinery foundation of vibration damping means incorporated therewith, said means comprising inverted channel members embedded in the foundation, and having openings in the web thereof, cover plates for said openings, continuous base members beneath each channel member, and spring means aligned in and supporting said channel members at the location of the said openings above the base members and adapted to absorb vertical shocks and also resist side thrust and shear.

3. An improved means for mounting heavy duty machinery on a floor or the like comprising structural members embedded in the machinery platform and constituting a part of a vibration damper including a base member resting on the said floor, and cooperating coil and flat spring devices arranged at spaced intervals between the structural members and the base, said coil and flat springs being loaded to produce a spring force acting to control vertically acting vibration forces, and said flat spring being also flexible vertically to resist side thrust.

4. A machinery vibration damper including, in combination, a rigid base and a damper housing for supporting the machinery, and spring means confined between the base and housing for absorbing vibrations manifested in a vertical direction during periods of normal operation and resonance when stopping and starting the machinery, said spring means comprising vertically arranged coil springs and a flat spring including horizontal and vertical portions and of lower frequency than the coil springs and said flat spring having its horizontal portion anchored to the base and its vertical portions connected to the housing thereby to come into play when the load on the coil springs lifts upwardly and also to resist side thrust and shear.

5. A machinery vibration damper including, in combination, a rigid base and a damper housing movable relative thereto, coil springs confined between the base and the housing, and flat springs including horizontal and vertical portions and of lower frequency than the coil springs and connected to the base and housing, the said horizontal spring portion being flexible in a vertical direction and providing increased resistance to upward movement and the vertical portions resisting side thrust and shear.

6. A machinery vibration damper including a base plate and a relatively movable damper housing, a flat spring having horizontal and vertical portions respectively connected to the base and housing, and means for progressively shortening the length of the flat spring as the damper housing rises due to upward surge resulting from resonance speed of the machinery.

7. A machinery vibration damper including a base plate, a relatively movable damper housing, a flat spring having a horizontal portion rigidly connected to the base and a vertical portion connected to the housing, and means adapted to be engaged by the horizontal portion for progressively shortening the leverage of the horizontal portion during upward movement of the spring.

8. A machinery vibration damper including a base plate, a relatively movable damper housing, a flat spring having a horizontal portion rigidly connected to the base and a vertical portion connected to the housing, and a plate having a progressively formed control surface serving as an abutment for the horizontal portion of the spring when the damper housing moves upwardly.

9. A machinery vibration damper including, in combination, a rigid base, a relatively movable damper housing, a plate secured to the base, a flat spring having a horizontal portion clamped to the base by said plate and a vertical portion connected to the housing, and coil springs confined between the upper side of the plate and the under side of the housing.

10. A machinery vibration damper including a damper housing, a base, a combined spring saddle and control plate mounted on the base, coil springs confined between the damper housing and the upper side of said plate, and a flat spring having a horizontally disposed portion clamped between the base and plate and having a vertical portion connected to the damper housing.

11. A machinery vibration damper including a damper housing, a base, a plate secured to the base and having an outwardly and upwardly inclined surface on its under side, a coil spring confined between the damper housing and the upper side of said plate, and a flat spring having a horizontal portion clamped between said plate and base and adapted to progressively engage with said inclined surface, said flat spring having a vertical portion connected to said damper housing.

12. A machinery vibration damper including a damper housing, a base, a plate secured to said base having a pair of outwardly and upwardly inclined surfaces on its under side, a coil spring confined between the damper housing and the upper side of said plate, and a flat spring of substantially U-shaped formation having its medial portion clamped between the plate and the base, the horizontal portions of said spring being adapted for progressive abutment with said inclined surfaces and the vertical portions thereof connected to said damper housing.

13. A vibration damper including a base, a damper housing, coil springs confined between the base and housing, and flat springs also arranged within the housing and connecting the same in opposition to the compressed coil springs.

14. A vibration damper including a base, a damper housing, coil springs confined between the base and housing, and flat springs arranged exteriorly of the housing and connecting the same in opposition to the compressed coil springs.

15. A vibration damper including a base and a housing, spring means adapted to be confined under compression between the base and housing, and flat spring means of low frequency connecting the base and housing, said flat spring means having maximum leverage when the coil springs are fully loaded and adapted to progressively shorten in leverage when said coil springs are unloaded.

16. The combination with a machinery foundation of vibration damping means incorporated therewith, said means comprising inverted channel members having spaced openings in the webs thereof and embedded in the foundation, base members beneath each channel member, spring means for supporting the channel members and located on the base members at spaced intervals corresponding to the said openings in the channel members, a cap member removably positioned over each opening and means carried by each cap member for effecting adjustment of the spring means.

17. Vibration isolation construction comprising in combination with a floor or the like, a machinery foundation including structural members having spaced openings and a concrete slab formed over and about said members and provided with lateral clearances at the locations of said openings, vibration damping spring units supported from the floor at the location of the said openings, and means at each opening detachably secured to the structural members constituting a removable upper abutment for said spring units.

18. Vibration isolation construction comprising in combination with a floor or the like, a machinery foundation including structural members presenting spaced parallel walls provided therebetween with spring access clearances and a concrete slab supported on said members and provided with recessed portions at the locations of said clearances, vibration damping spring units supported from the floor between said walls at the location of the said clearances, means at each clearance detachably secured to the structural members and constituting a removable upper abutment for said spring units, means on said last named means for effecting the adjustment of said spring units, and cover plates for said recessed portions in the slab.

19. A machinery vibration damper including a base supported on the floor and a relatively movable damper housing arranged over the base, a coil spring mounted between the base and housing, and horizontally disposed flat spring anchored to the base and having an upturned end portion rigidly connected to the housing, said coil and flat springs adapted to absorb vertical shocks and the flat spring resisting side thrust due to the depth of its section in the direction in which the thrust acts.

20. Vibration isolation construction, adapted to rest on a floor or the like, including a machinery foundation comprising structural members presenting spaced parallel walls, a concrete slab supported on said members and provided with recesses at spaced intervals to expose said members, plates removably secured to the structural members at the location of the recesses in the slab, and spring means confined between the floor and said plates and supporting the combined structural members and slab.

21. An improved vibration isolating means for mounting a machine upon a floor or other support, comprising a concrete slab upon which the machine is mounted, structural members embedded in and reinforcing said slab and presenting spaced side walls, a member rigid with said side walls and bridging the space therebetween, spring means between said side walls supported by said floor or other support and acting through said bridging member to resiliently support said structural members and said slab, and means carried by said bridging member and acting through said spring means to vertically adjust the slab relative to the floor or other support.

22. The combination as set forth in claim 21 in which the slab is provided with recesses above and alined with the adjusting means to afford access to the latter.

SIEGFRIED ROSENZWEIG.